United States Patent
Zhang et al.

(10) Patent No.: US 10,108,501 B2
(45) Date of Patent: Oct. 23, 2018

(54) TERMINAL BACKUP AND RECOVERY METHOD

(71) Applicant: BEIJING QIHOO TECHNOLOGY COMPANY LIMITED, Beijing (CN)

(72) Inventors: Zhizhou Zhang, Beijing (CN); Ting Zhang, Beijing (CN); Zhaohe Geng, Beijing (CN); Junliang Song, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 871 days.

(21) Appl. No.: 14/347,274

(22) PCT Filed: Sep. 26, 2012

(86) PCT No.: PCT/CN2012/081984
§ 371 (c)(1),
(2) Date: Mar. 26, 2014

(87) PCT Pub. No.: WO2013/044794
PCT Pub. Date: Apr. 4, 2013

(65) Prior Publication Data
US 2014/0222761 A1    Aug. 7, 2014

(30) Foreign Application Priority Data

Sep. 30, 2011   (CN) .......................... 2011 1 0304824
Sep. 30, 2011   (CN) .......................... 2011 1 0304838
(Continued)

(51) Int. Cl.
*G06F 11/14*      (2006.01)

(52) U.S. Cl.
CPC ...... *G06F 11/1464* (2013.01); *G06F 11/1451* (2013.01); *G06F 11/1469* (2013.01); *G06F 2201/83* (2013.01)

(58) Field of Classification Search
CPC ............. G06F 11/1464; G06F 11/1451; G06F 11/1469; G06F 2201/83
See application file for complete search history.

(56) References Cited

U.S. PATENT DOCUMENTS 7,350,149 B1 *  3/2008  Franceschelli, Jr. ......................... G06F 9/4443
                                                                    709/203
7,634,511 B1 * 12/2009  Freiheit ............... G06F 11/1458
(Continued)

OTHER PUBLICATIONS

CN1852534(A), Chai Xiaoqian Li, published Oct. 25, 2006, machine translation of patent, 22 pages.*
(Continued)

*Primary Examiner* — Robert Beausoliel, Jr.
*Assistant Examiner* — Susan F Rayyan
(74) *Attorney, Agent, or Firm* — Polsinelli PC

(57) ABSTRACT

The invention discloses a terminal backup and recovery method. When in backup, a user interface is provided at a terminal side first, so as to provide, according to a preset display policy, different backup categories for a user to select, wherein the different backup categories comprise different backup objects. Then, according to a backup category and object selected by the user, at the terminal side, a terminal file corresponding to the backup object is backed up at a cloud server according to a preset backup policy. When in recovery, according to a recovery category and object selected by the user, a file already backed up by the terminal/user and corresponding to the backup object is determined at the cloud server, and according to a preset recovery policy, corresponding recovery is executed at the terminal side by using the backed-up file. The invention provides classified backup and recovery, and increases the speed of backup and recovery.

14 Claims, 6 Drawing Sheets

(30) Foreign Application Priority Data

| Sep. 30, 2011 | (CN) | .......................... 2011 1 0304841 |
| Sep. 30, 2011 | (CN) | .......................... 2011 1 0304846 |

(56) References Cited

U.S. PATENT DOCUMENTS

| 8,290,912 | B1* | 10/2012 | Searls | G06F 11/1453 |
| | | | | 707/654 |
| 8,732,479 | B1* | 5/2014 | Henriksen | G06F 11/1464 |
| | | | | 709/201 |
| 2008/0034307 | A1* | 2/2008 | Cisler | G06F 9/4443 |
| | | | | 715/764 |
| 2008/0126442 | A1* | 5/2008 | Cisler | G06F 11/1461 |
| 2010/0274982 | A1* | 10/2010 | Mehr | G06F 11/1458 |
| | | | | 711/162 |
| 2010/0318782 | A1 | 12/2010 | Auradkar et al. | |
| 2011/0258481 | A1* | 10/2011 | Kern | G06F 11/1484 |
| | | | | 714/4.1 |
| 2012/0154119 | A1* | 6/2012 | Schepps | G08B 21/24 |
| | | | | 340/10.1 |
| 2012/0191655 | A1* | 7/2012 | Yao | H04W 8/24 |
| | | | | 707/640 |
| 2012/0303583 | A1* | 11/2012 | Chowdhry | G06F 11/1451 |
| | | | | 707/640 |

OTHER PUBLICATIONS

International Search Report regarding PCT/CN2012/081984, dated Jan. 3, 2013, 6 pages.
CN101146285A, published Mar. 19, 2008, English translation of Abstract only, one page.
CN1838083A, published Sep. 27, 2006, English translation of Abstract only, one page.
CN1852534A, published Oct. 25, 2006, English translation of Abstract only, one page.
CN101324858A, published Dec. 17, 2008, English translation of Abstract only, one page.
CN102024114A, published Apr. 20, 2011, English translation of Abstract only, one page.
CN102200936A, published Sep. 28, 2011, English translation of Abstract only, one page.

* cited by examiner

TERMINAL BACKUP AND RECOVERY METHOD

FIELD OF THE INVENTION

The invention relates to the field of computer technology, and in particular to a terminal backup and recovery method.

BACKGROUND OF THE INVENTION

With the development of computer technology, programs installed in various computer terminals are also more and more. For a personal computer terminal having generally operating system programs and some applications installed therein, these programs cooperate with each other to work to satisfy a variety of operational needs of a user.

However, after the terminal runs a period of time, many programs will run more and more slowly due to the disruption by a virus or the generation of their own junk files, or even be caused to be unable to be normally opened or used due to file damage. For this situation, there appears a system backup and restore tool such as Ghost, etc., which backs up all the data of a partition as a whole, and restores the backup data to the original partition when needed.

However, the execution speed of this kind of backup and restore tool is rather slow. Since its principle of backup is to clone and back up the original data sector by sector, and write back intact the whole backup data when in recovery and restoration, not only a relatively large storage space is required, but it is also very time-consuming, and if applied in network-based storage and backup, then the amount of data sent by it is considerably great.

On the other hand, the backup and restore operation performed by current backup and restore tools is relatively mechanical and rigid, wherein just like photography, it duplicates an original data file completely intact, and restores it back, and does not take into account composition characteristics and operation characteristics of a program itself; and therefore, even the junk files or harmful files caused to be present by long running before backup will still be backed up and stored faithfully, whereas these junk files or harmful files which give rise to an obstacle to the program running, after restored back again to a terminal, will still cause the program not to run smoothly.

SUMMARY OF THE INVENTION

In view of the above problems, the invention is proposed to provide a terminal backup and recovery method which overcomes the above problems or at least in part solves or mitigates the above problems.

According to an aspect of the invention, there is provided a terminal backup method comprising:

providing a user interface at a terminal side, so as to provide, according to a preset display policy, different backup categories for a user to select, wherein the different backup categories contain different backup objects;

backing up, according to a backup category selected by the user, at the terminal side, a backup object contained in the backup category to a cloud server.

Optionally, the backup category comprises a current system, an application, or user data related with an application, wherein a backup object contained in the backup category of current system comprises an installed application and a core file of the operating system;

a backup object contained in the backup category of application comprises an application already installed at the terminal; and a backup object contained in the backup category of user data related with an application comprises a user data file of the application.

Optionally, when the backup category is a current system, the method further comprises: obtaining, at the terminal side, the unique feature information of an installed application and a core file of the operating system, and sending to the cloud server for backup and storage;

wherein a file database is preset at the cloud server, and in the file database there are stored core files contained in different operating systems and unique feature information thereof, and stored unique feature information and installation files of different applications.

Optionally, if the core file of the operating system corresponding to the unique feature information sent by the terminal side cannot be determined in the file database, then the local core file corresponding to the unique feature information is sent by the terminal side to the cloud server for backup and storage.

Optionally, when the backup category is an application, obtaining, at the terminal side, the unique feature information of an installed application, and sending to the cloud server for backup and storage;

wherein a file database is preset at the cloud server, and in the file database there are stored unique feature information and installation files of different applications.

Optionally, when the backup category is user data related with an application, obtaining, at the terminal side, the user data of an application selected by the user, and sending to the cloud server for backup and storage.

According to another aspect of the invention, there is provided a terminal recovery method comprising:

providing a user interface at a terminal side, so as to provide, according to a preset display policy, different backed-up categories for a user to select for recovery, wherein the different backed-up categories contain different backed-up objects;

determining, according to a backed-up category selected by the user, a file corresponding to a backed-up object contained in the backed-up category at a cloud server, and utilizing the file to perform a corresponding recovery at the terminal side.

Optionally, the backed-up category comprises a current system, an application, or user data related with an application, wherein a backed-up object contained in the backed-up category of current system comprises an installed application and a core file of the operating system, and a file corresponding to a backed-up object contained in the backed-up category comprises the unique feature information of an installed application and a core file of the operating system;

a backed-up object contained in the backed-up category of application comprises an application already installed in the terminal, and a file corresponding to a backed-up object contained in the backed-up category comprises the unique feature information of the installed application; and a backed-up object contained in the backed-up category of user data related with an application comprises a user data file of the application, and a file corresponding to a backed-up object contained in the backed-up category comprises a user data file of the application.

Optionally, when the backed-up category is a current system, the unique feature information of a core file of the operating system of the terminal already backed up at the cloud server side is matched with the current unique feature information of a core file of the local operating system at the terminal side;

the core file corresponding to the current unique feature information matched unsuccessfully at the terminal side is deleted, and the core file corresponding to the unique feature information matched unsuccessfully is received from the cloud server for storage;

according to the backed-up unique feature information of an application already installed at the terminal side, an installation is performed at the terminal side using the installation file of a corresponding application pre-stored in a file database in the cloud server;

wherein in the file database there are stored core files contained in different operating systems and unique feature information thereof, and unique feature information and installation files of different applications.

Optionally, when the backed-up category is an application, the method further comprises:

performing, according to the backed-up unique feature information of an application already installed at the terminal side, an installation at the terminal side using the installation file of a corresponding application pre-stored in the file database in the cloud server;

optionally, in the file database there are stored unique feature information and installation files of different applications.

Optionally, when the backed-up category is user data related with an application, the method further comprises:

receiving the backed-up user data of the application from the cloud server for storage.

According to yet another aspect of the invention, there is provided a terminal backup method comprising:

presetting a file database at a cloud server, wherein in the file database there are stored core files contained in different programs and unique feature information thereof;

receiving from a terminal the unique feature information of a core file of a program to be backed up and storing it at the cloud server; and determining by the cloud server, according to the file database, the correspondence between the terminal and the core file represented by the unique feature information of a core file of a program to be backed up.

Optionally, there is further comprised, if the cloud server cannot determine in the file database the core file corresponding to the unique feature information received from the terminal, backing up and storing the local core file of the terminal corresponding to the unique feature information.

Optionally, the cloud server receives from the terminal a non-core file, a modified entry in a registry, a relative positional relationship between core files, and/or a positional relationship between a core file and a non-core file of a program to be backed up for backup and storage.

Optionally, in the file database there are further stored unique feature information of an application and its installation file.

According to still another aspect of the invention, there is provided a terminal recovery method comprising:

determining by a cloud server, according to a recovery request of a terminal, the backed-up unique feature information of a core file of a program in the terminal;

matching by the cloud server the backed-up unique feature information with the current unique feature information of a core file of a local corresponding program in the terminal;

deleting the core file corresponding to the current unique feature information matched unsuccessfully in the terminal, and sending the core file corresponding to the unique feature information matched unsuccessfully with the current unique feature information in a file database to the terminal for storage;

wherein the file database is preset at the cloud server and stores core files contained in different programs and unique feature information thereof.

Optionally, the cloud server sends a non-core file, and a modified entry in a registry of a backed-up program to the terminal for storage.

Optionally, the step of sending the core file corresponding to the unique feature information matched unsuccessfully with the current unique feature information in a file database to the terminal for storage further comprises: storing a core file according to the relative positional relationship between core files already recorded at the cloud server.

According to an aspect of the invention, there is provided a computer program comprising a computer readable code which causes a server to execute a terminal backup or recovery method as claimed when the computer readable code is running on the server.

According to still another aspect of the invention, there is provided a computer readable medium storing therein a computer program as claimed.

The beneficial effects of the invention lie in that:

when applying the invention, a user may perform a backup and recovery only for a part he is interested in or pays attention to, since it provides options of a category and an object;

secondly, the invention need not transfer an entity file, only need transfer the feature information of a file, and therefore can increase the speed of backup and recovery very greatly and reduce the amount of data transmission; moreover, when in recovery, since the recovery is based on difference comparison, a file for which there is no difference in its feature information before and after backup need not be recovered, and only the file for which there is difference needs to be recovered, not only the speed of recovery is high, but also a harmful junk file(s) at the terminal side is (are) deleted, and the performance of a program is improved.

The above description is only an overview of the technical solutions of the invention. In order to be able to more clearly understand the technical means of the invention to implement it according to the content of the specification, and for the above and other objects, features and advantages of the invention to be more apparent, the embodiments of the invention will be illustrated in the following.

BRIEF DESCRIPTION OF THE DRAWINGS

Other various advantages and benefits will become apparent to those of ordinary skills in the art by reading the following detailed description of the preferred implementations. The drawings are only for the purpose of showing the preferred implementations, and are not considered to be limiting to the invention. And throughout the drawings, like reference signs are used to denote like components. In the drawings.

DETAILED DESCRIPTION OF THE INVENTION

In the following the invention will be further described in connection with the drawings and the particular implementations.

In the following the embodiments of the invention will be described in detail in connection with the drawings.

Figure 1:
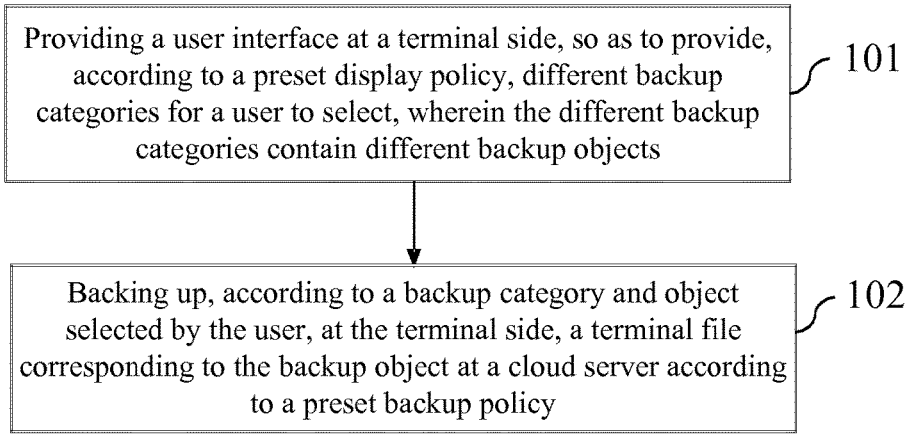
FIG. 1 shows schematically a flow chart of a terminal backup method according to an embodiment of the invention.

As shown in FIG. 1, FIG. 1 is a flow chart of a cloud architecture based terminal object classification and backup method according to an embodiment of the invention comprising:

step 101: providing a user interface at a terminal side, so as to provide, according to a preset display policy, different backup categories for a user to select, wherein the different backup categories contain different backup objects;

step 102: backing up, according to a backup category and object selected by the user, at the terminal side, a terminal file corresponding to the backup object to a cloud server according to a preset backup policy.

Therein a file database may be preset in the cloud server, and in the file database there are stored different terminal files and their unique feature information; whereas the terminal side may back up and store the unique feature information of the terminal file corresponding to the backup object at the cloud server according to the preset backup policy.

For example, the backup category may be the whole current system, and a backup object contained in this category comprises an installed application and a core file of the operating system; in the file database preset in the cloud server there are stored core files and initial registry files of different operating systems as well as unique feature information of the core files, and stored unique feature information and installation files of different applications.

Figure 2:
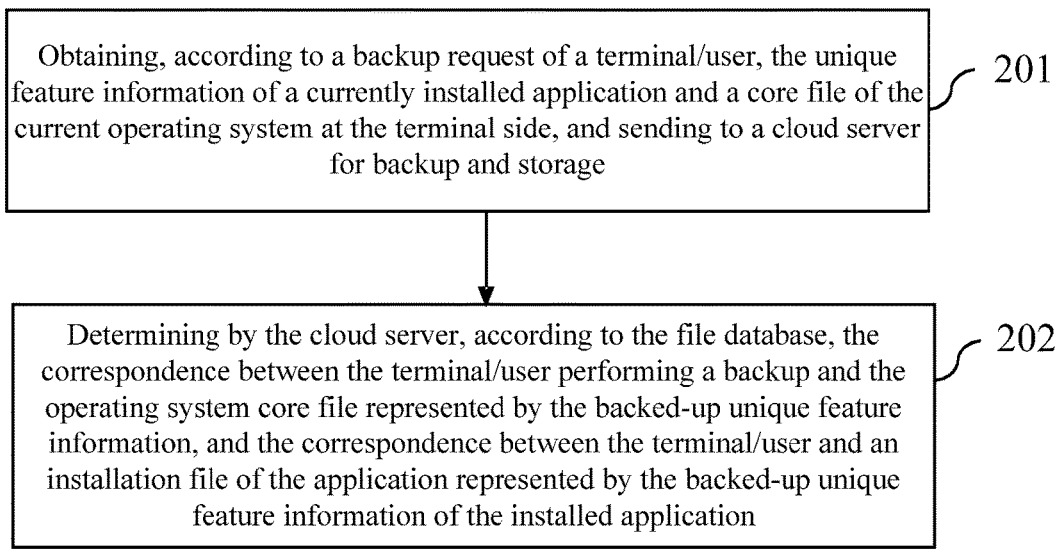
FIG. 2 shows schematically a flow chart of backing up a current system according to an embodiment of the invention.

As shown in FIG. 2, FIG. 2 is a flow diagram of backing up a current system according to an embodiment of the invention comprising:

step 201: obtaining, according to a backup request of a terminal/user, the unique feature information of a currently installed application and a core file of the current operating system at the terminal side, and sending to a cloud server for backup and storage;

step 202: determining by the cloud server, according to the file database, the correspondence between the terminal/user performing a backup and the operating system core file represented by the backed-up unique feature information, and the correspondence between the terminal/user and an application installation file represented by the backed-up unique feature information of the installed application.

The unique feature information of a core file of an operating system may be information that can be uniquely distinguished, such as the signature information of the file, or an MD5 value, etc.; the unique feature information of an application may be information that can be uniquely distinguished, such as the name and version number or ID number, etc. of the program.

Furthermore, in the file database there are further stored initial registry files of different operating systems; the cloud server determines the correspondence between the terminal/user performing a backup and an initial registry file according to the file database.

The concepts of a cloud server have been considerably developed and applied. For example, for establishing a virus feature library, it may be arranged at the cloud server, and a client only needs to upload features of a local file to compare them with virus features in the cloud server, thereby utilizing a blacklist to search and kill a virus.

Similarly, in the embodiment of the invention, a file database is preset in the cloud server, in which core files of operational programs of different categories and different versions, and unique feature information of core files, as well as installation files of different applications are stored.

Through long-term accumulation, a large file database may be established at the cloud server, which contains a multitude of commonly used program files, for example, some commonly used operating systems and some commonly used applications may be included therein.

However, the range of original core files of various programs (e.g., an operating system) may be known by an actual analysis. For example, for an operating system, the core file may be an initial file released in the terminal by the operating system after installation; or those master files essential to maintaining the operation of the operating system; or may also be referred to those common files still maintaining the same content after the same operating system program is installed at different terminals and runs a period of time.

The choice of the range of core files may be determined according to different programs (e.g., an operating system program) and different backup requirements. Clearly, the larger the range of backed-up core files, the more the restored program is faithful to the modality when being backed up at the terminal; whereas the smaller the range of backed-up core files, the less the amount of backed-up data, and the more the restored program is approximate to the initial modality of the operating system program after installation. However, it is quite clear that some junk files possibly generated after the program runs a period of time or some harmful files injected by a malicious program such as a virus, etc. will not be included in the core file.

For the same operating system program running in different terminals, the most content of its core files is the same, the disrupted files are the minority after all, and therefore, this provides a basis for reusing files of the cloud file database.

For a core file contained in the same operating system program running in the terminal, if it is not disrupted, its signature information will be consistent with the signature information of the core file in the cloud database. Therefore, saving the signature information of the core file of the operating system program in the terminal at the server side will serve the same purpose as backing up the core file at the server side, since the core file having the same signature information has been already pre-stored in the database. It is only those core files for which the signature information is inconsistent that need to be actually uploaded by the terminal side to the server for storage.

Thus, the terminal will only need to upload the unique feature information of core files of an operating system program backed up to finish the work of backing up an operating system, and the cloud server may determine which the operating system core files backed up by the terminal are according to the unique feature information.

Figure 3:
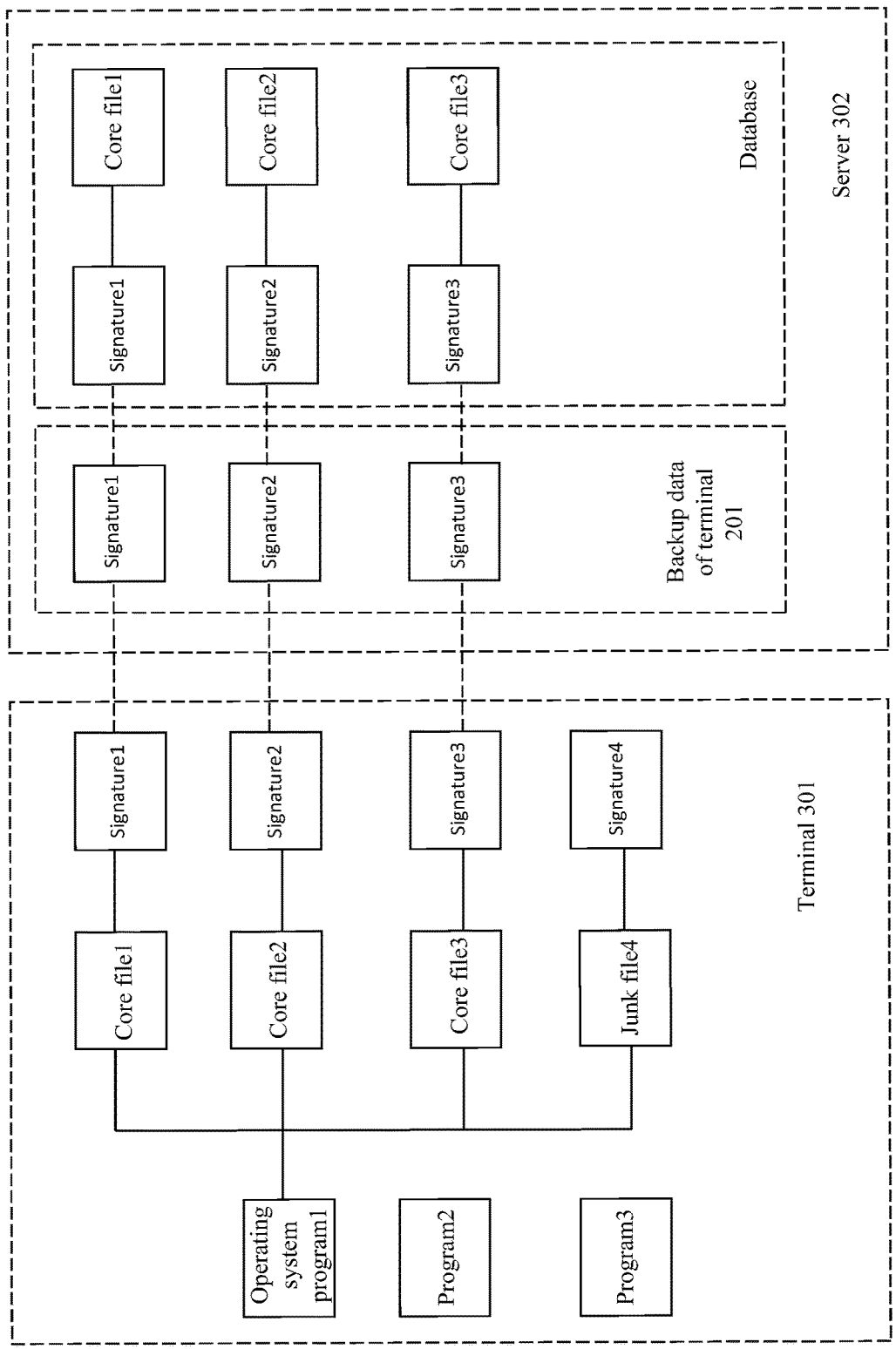
FIG. 3 shows schematically a schematic diagram of backup according to an embodiment of the invention.

As shown in FIG. 3, at a terminal 301 is running an operating system program 1 to be backed up, which contains a core file 1, a core file 2, a core file 3 and a junk file 4, their corresponding unique signature information being a file signature 1, a file signature 2, a file signature 3, and a file signature 4. At a server 302, in a database are recorded the core file 1, the core file 2, and the core file 3 of the operating system program 1, their corresponding unique signature information being the file signature 1, the file signature 2, and the file signature 3. However, the content backed up at the server side only needs to record an identification 201 of the terminal or user and the file signature 1, the file signature 2, and the file signature 3 of the backed-up operating system program 1. It is quite clear that, the data content backed up by the terminal is very little, but enough to determine at the server side the program data that the terminal needs to back up. Moreover, since what is backed up are core files of a program, and some possible junk files are excluded, this not only reduces the amount of backup data, but also may restore a clean program after recovery.

The terminal side may obtain the unique feature information of a core file of an operating system program to be backed up according to the name of the core file of the operating system program to be backed up recorded in a preset rule table. This rule table may be owned by the terminal, for example, initial files released by the operating system program recorded at the terminal side when installation is performed on the program; or asked for from the server side according to the name and version of a program by scanning a local file list of the terminal, whereas at the server side there is stored a rule table of core files of a multitude of commonly used programs. It may be possible that the size of the range of core files is flexibly controlled by way of the rule table.

Figure 4:
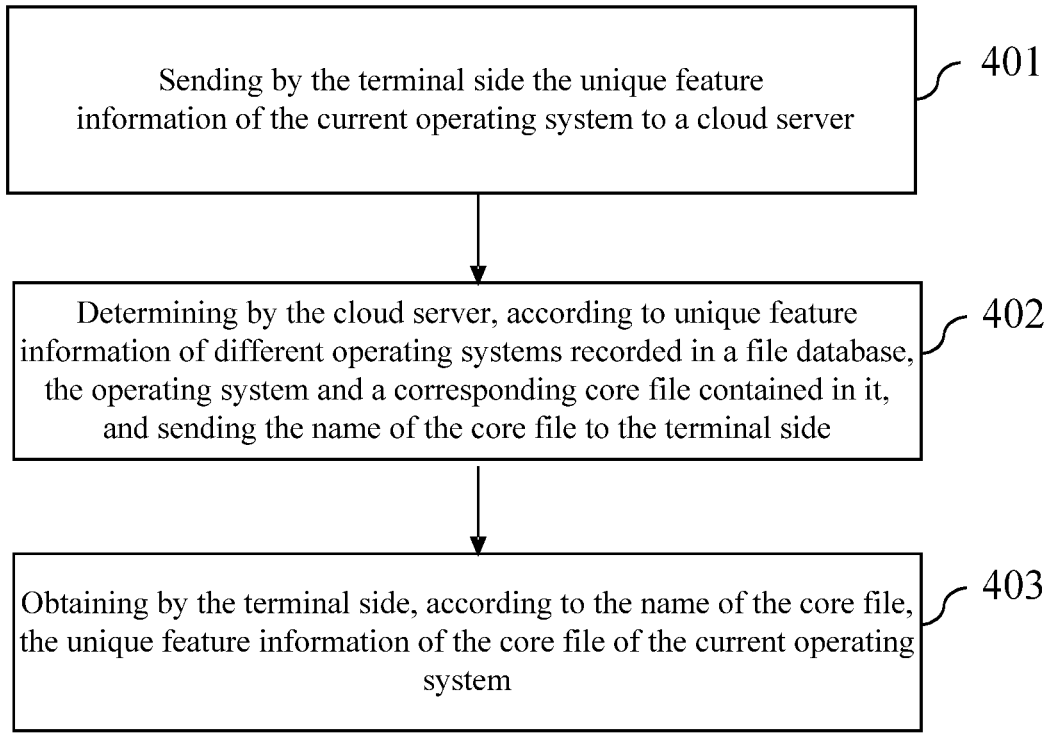
FIG. 4 shows schematically a flow chart of obtaining at a terminal side the unique feature information of a core file of an operating system program to be backed up according to an embodiment of the invention.

In addition, a core file may be determined by making a direct use of a file database described in an embodiment of the invention. As shown in FIG. 4, FIG. 4 is a flow chart of obtaining at a terminal side the unique feature information of a core file of an operating system program to be backed up according to an embodiment of the invention comprising:

step 401: sending by the terminal side the unique feature information of the current operating system to a cloud server;

step 402: determining by the cloud server, according to unique feature information of different operating systems recorded in a file database, the operating system and a corresponding core file contained in it, and sending the name of the core file to the terminal side;

step 403: obtaining by the terminal side, according to the name of the core file, the unique feature information of the core file of the current operating system.

Therein, the unique feature information of the operating system may be the information that may uniquely determine the program object, such as the name and version number or program ID, etc. of the operating system program.

According to an embodiment of the invention, if the cloud server cannot determine in the file database the core file corresponding to the unique feature information sent by the terminal side, it indicates that the signature information of the core file at the terminal side is inconsistent with the signature information of the core file in the database at the server side, it may be a personalized file already modified by the user, and at this point, a local core file corresponding to the unique feature information may be sent by the terminal side to the cloud server for backup and storage.

Furthermore, it may also be possible to define some non-core files of the operating system program, for example, some statically configured files, or files recording user data. Since these files, although not affecting the operation of the program, might record the use habit of the user, they may also be extracted when in backup. Thus, a current non-core file of the program to be backed up may be obtained by the terminal side, and sent to the cloud server for backup and storage. Or further, the unique feature information of a non-core file may be obtained and backed up and stored. Likewise, the determination of a non-core file may employ the form of a rule table.

For most programs, files released after its installation will be under the same directory path, namely, their relative positional relationship is not important. However, for some comparatively complex programs, e.g., an operating system program, the situation may arise where multiple layers are nested in the directory, and at this time the relative positional relationship between core files may be saved in the file database; it may also be possible that the relative positional relationship between core files of the program to be backed up is sent by the terminal side to the cloud server for storage.

Likewise, for a non-core file, the terminal side may also send the relative positional relationship between a current core file and a non-core file to the cloud server for storage.

However, for an installed application at the terminal, it suffices to back up the unique feature information of the application, e.g., the name and version number or ID number of the application. Since in the file database at the server side there are stored unique feature information of different applications and their installation files, a corresponding installation file may be determined by learning about the unique feature information backed up at the terminal, so as to be used when in recovery.

Nevertheless, if the cloud server cannot determine in the file database the application installation file corresponding to the unique feature information sent by the terminal side, then a local application file corresponding to the unique feature information and the modification information of the operating system registry are sent by the terminal side to the cloud server for backup and storage.

Furthermore, it may also be possible to send user data of an application already installed at the terminal side to the cloud server for backup and storage, in order that the user data may be restored together when in recovery.

According to a further embodiment of the invention, the backup category may be an application, and a backup object contained in this category comprises an application installed at the terminal side; and in the file database preset in the cloud server there are stored unique feature information and installation files of different applications.

Figure 5:
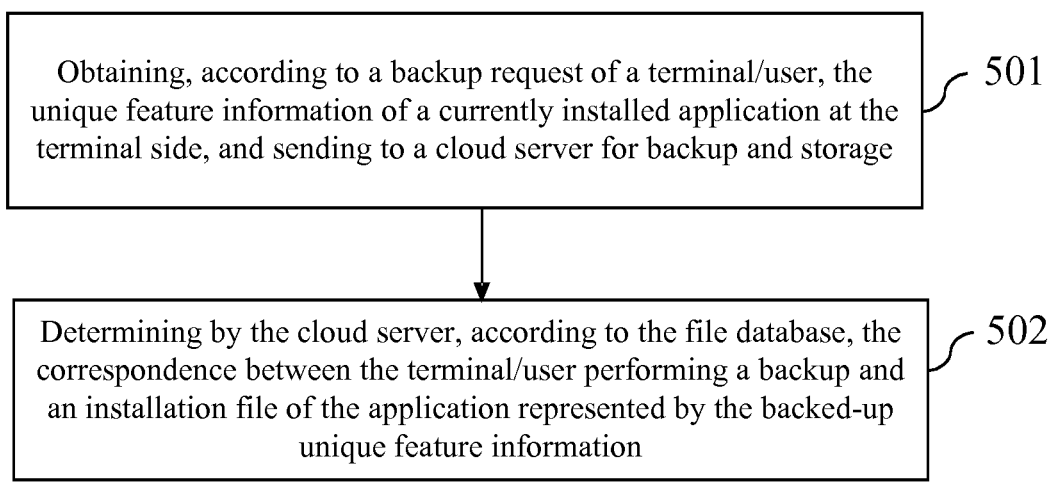
FIG. 5 shows schematically a flow chart of backing up an application according to an embodiment of the invention.

As shown in FIG. 5, FIG. 5 is a flow chart of backing up an application according to an embodiment of the invention comprising:

step 501: obtaining, according to a backup request of a terminal/user, the unique feature information of a currently installed application at the terminal side, and sending to a cloud server for backup and storage;

step 502: determining by the cloud server, according to the file database, the correspondence between the terminal/user performing a backup and the application installation file represented by the backed-up unique feature information.

According to a further embodiment of the invention, the backup category may be user data related with an application, e.g., the favorites setting of a browser, or the user inbox of a mail program, etc., and a backup object contained in this category comprises a user data file of the application. When in backup, obtaining the user data of an application selected by the user according to a backup request of the terminal/user, and sending to the cloud server for backup and storage.

Figure 6:
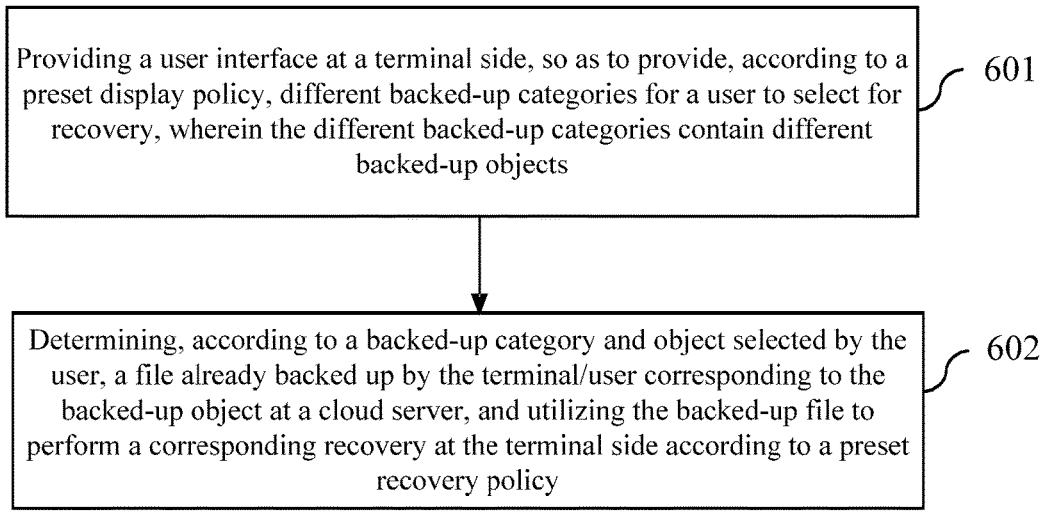
FIG. 6 shows schematically a flow chart of a terminal recovery method according to an embodiment of the invention.

As shown in FIG. 6, FIG. 6 is a flow chart of a method for cloud architecture based terminal object classification and recovery according to an embodiment of the invention comprising:

step 601: providing a user interface at a terminal side, so as to provide, according to a preset display policy, different backed-up categories for a user to select for recovery, wherein the different backed-up categories contain different backed-up objects;

step 602: determining, according to a backed-up category and object selected by the user, a file already backed up by the terminal/user corresponding to the backed-up object at a cloud server, and utilizing the backed-up file to perform a corresponding recovery at the terminal side according to a preset recovery policy.

Therein, a file database may be preset in the cloud server, and in the file database there are stored different terminal files and their unique feature information; the cloud server may determine in the file database, according to the unique feature information already backed up by the terminal/user, the file already backed up by the terminal/user corresponding to the backup object.

According to an embodiment of the invention, the backed-up category comprises a current system, and a backed-up object contained in this category comprises an installed application and a core file of the operating system; and the backed-up file corresponding to the backup object comprises the unique feature information of an installed application and a core file of the operating system.

Figure 7:
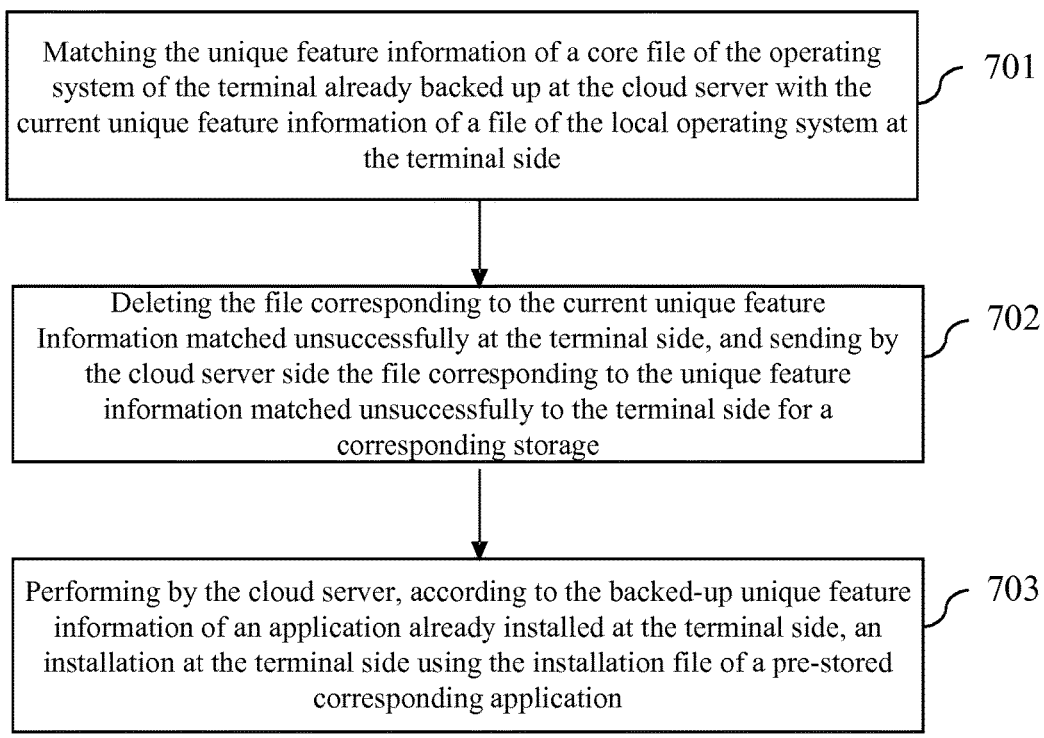
FIG. 7 shows schematically a flow chart of recovering a current system according to an embodiment of the invention.

As shown in FIG. 7, FIG. 7 is a flow chart of recovering a current system according to an embodiment of the invention comprising:

step 701: matching the unique feature information of a core file of the operating system of the terminal already backed up at the cloud server with the current unique feature information of a file of the local operating system at the terminal side;

step 702: deleting the file corresponding to the current unique feature information matched unsuccessfully at the terminal side, and sending by the cloud server side the file corresponding to the unique feature information matched unsuccessfully to the terminal side for a corresponding storage;

step 703: performing by the cloud server, according to the backed-up unique feature information of an application already installed at the terminal side, an installation at the terminal side using the installation file of a pre-stored corresponding application, wherein in the cloud server is preset a file database, in which there are stored initial registry files and core files contained in different operating systems as well as unique feature information of the core files, and stored unique feature information and installation files of different applications.

In the file database there may be further stored initial registry files of different operating systems; before the step of performing the installation of the application at the terminal side using the corresponding installation file, there is further comprised: sending by the cloud server an initial registry file stored in the file database corresponding to the operating system at the terminal side to the terminal side for a corresponding storage.

If a registry file is contained in a core file selected when in backup, since the personalization of a registry file is very strong, often after running a period of time, and a difference will be made between it and the initial registry file, thus, since the unique feature information of the registry file at the terminal side is not the same as the unique feature information of a core file in the file database when in backup, and it is impossible to determine the corresponding core file in the file database accordingly, it will be required to upload the registry file at the terminal side to the server for backup and storage, and resend it back to the terminal side when in recovery.

However, since the registry at the terminal may have already contained junk data when in backup, and if it is recovered to its original state, an improvement of performance cannot be brought about, in the file database there may be further stored initial clean registry data of the operating system, and when in recovery, the initial registry data may be sent to the terminal side to replace its current registry data after the file of the operating system is recovered, thus, a clean registry file may be brought about for the terminal side and an application may be installed on this basis.

Still further, a registry file may not be contained in a core file selected when in backup, but an initial registry is uniformly used when in recovery, then the backup and recovery may be performed more quickly, and a recovery of performance of the operating system is brought about at the same time.

The cloud server may learn about a current user according to the user login information of the terminal side, and may also know the data the user ever backed up. For most terminals/users, the server may determine the unique feature information backed up by the user after receiving his recovery request. As shown in FIG. 2, a user terminal—an operating system program backed up by the terminal side—a core file at the terminal side and its signature information—the backed-up signature information of a core file—signature information recorded in a cloud file database—core files in the database, these correspondences are linked to each other by the unique feature information.

At recovery, the unique feature information of a core file of the operating system already backed up at the cloud server side may be matched with the current unique feature information of all the files of a local corresponding program at the terminal side. Thus, the terminal side need not determine the range of core files of the operating system, all the local program files inconsistent with the backed-up signature information may be deleted, including some local junk files related with the program and files whose signature information is changed due to the damage or modification of the files; whereas at the server side, the backed-up signature information that may be matched successfully represents that a corresponding file is intact at the terminal side, while the backed-up signature information that cannot be matched successfully represents that an original file has been changed at the terminal side, and this requires to utilize a corresponding file in the file database to be sent to the terminal side for storage. Since the changed original file is already deleted because it cannot be matched successfully, the corresponding file is sent to the terminal side to replace the original file. It can be seen that, the recovery manner of the embodiment of the invention is based on a feature comparison, only a file whose signature information has been changed needs to be actually transferred from the server to the terminal, which greatly reduces the amount of data transmission, and deletes the junk files generated during the operation of a program at the terminal side, and improves the system performance at the terminal.

At recovery, it may also match the unique feature information of a core file of an operating system program already backed up at the cloud server side with the current unique feature information of a core file of a local corresponding program at the terminal side.

Moreover, for the step of matching the unique feature information between the core files, it may be performed by the terminal side, and may also be performed by the server side.

For example, the unique feature information of the core file of the operating system program already backed up may be sent by the cloud server to the terminal side; and then, the terminal side matches the received unique feature information of the core file with the current unique feature information of the core file of the local corresponding program.

Or, the current unique feature information of the core file of the operating system program to be recovered may be sent by the terminal side to the cloud server; and then, the cloud server matches the received current unique feature information with stored unique feature information of the core file of the operating system program already backed up by the terminal.

That only a match between the core files is performed may decrease the range of files deleted at the terminal side, and thereby may retain personalized files at the terminal side more accurately, or is complementary to the restoration of a non-core file.

If at the server side there is further backed up a non-core file of an operating system, then the backed-up non-core file of the operating system program in the terminal side may be further sent by the cloud server to the terminal side for a corresponding storage.

If at the cloud server there are backed up a non-core file and its corresponding unique feature information, then the unique feature information of the non-core file of the operating system program already backed up at the cloud server may be matched with the current unique feature information of a file of a local corresponding program at the terminal side. If the match is consistent, then it indicates that the file is intact and need not be replaced, and if the match is inconsistent, then the non-core file matched unsuccessfully at the terminal side may be deleted, and the non-core file matched unsuccessfully and backed up at the server side is sent to the terminal side for a corresponding storage.

Nevertheless, for a storage path of a program file at the terminal side, it may be stored according to a default installation path, and also an installation path of the program at the terminal side may be known by the dynamic search technology. In effect, the installation path of the program may be known as long as there is a core file at the terminal side.

Furthermore, the terminal side may further store a core file according to the relative positional relationship between core files already recorded at the cloud server; or store a non-core file according to the relative positional relationship between a non-core file and a core file already recorded at the cloud server.

Under some particular circumstances, if the corresponding program is not found locally at the terminal, then it indicates that the operating system may have been already replaced, and at this point a core file corresponding to the backed-up unique feature information in the cloud server may be sent to the terminal side for a corresponding storage.

In addition, at recovery, if the terminal side needs to know the range of core files of the program, likewise, the name of a core file of the local corresponding program may be determined according to a preset rule table; or the name of the local corresponding core file may be determined according to the name of a core file of the program recorded in the file database in the cloud server.

Nevertheless, for recovery of an application, it is to utilize an installation file in the file database at the server side to perform an overwrite installation locally at the terminal side, or first save the configuration file and user data of the application locally, then perform an installation, and correspondingly restore the configuration file and user data after the installation.

According to a further embodiment of the invention, the backup category may comprise an application, and a backup object contained in this category comprises an application already installed at the terminal; the backed-up file or data corresponding to the backup object comprises the unique feature information of the installed already application.

At recovery, an installation is performed at the terminal side by the cloud server according to the backed-up unique feature information of an application already installed at the terminal side using a pre-stored installation file of a corresponding application, whereas in the cloud server is preset a file database in which there are stored unique feature information and installation files of different applications.

According to yet another embodiment of the invention, the backup category may comprise user data related to an application, and a backup object contained in this category comprises a user data file of the application; and the backed-up file or data corresponding to the backup object comprises a user data file of the application;

At recovery, the user data of the backed-up application may be sent from the cloud server to the terminal side for a corresponding storage.

It can be seen that, in one embodiment of the invention, since a category option is provided at backup wherein a different category further comprises different backup objects, by selecting a category and an object, that a backup and recovery is performed only for a part a user pays attention to is implemented, and the management of a terminal by the user is facilitated. Meanwhile, at backup, the invention only needs to back up the feature information of a current system, and need not actually back up the content of a file, therefore, the speed of backup is very high and the amount of data transmitted is greatly reduced; whereas at recovery, since it is a recovery based on difference comparison, namely, a core file need not be recovered if the feature information of the file has not been changed, and only for a file of which the feature information has been changed, a corresponding file needs to be downloaded from the database, thus, the speed of recovery is also very high, and the amount of transmission is very little. Furthermore, since it is a recovery based on difference comparison, a harmful file(s) such as a junk file which is different with the range or content of a file at backup may be cleared off, and the performance of a program is improved after recovery.

Figure 8:
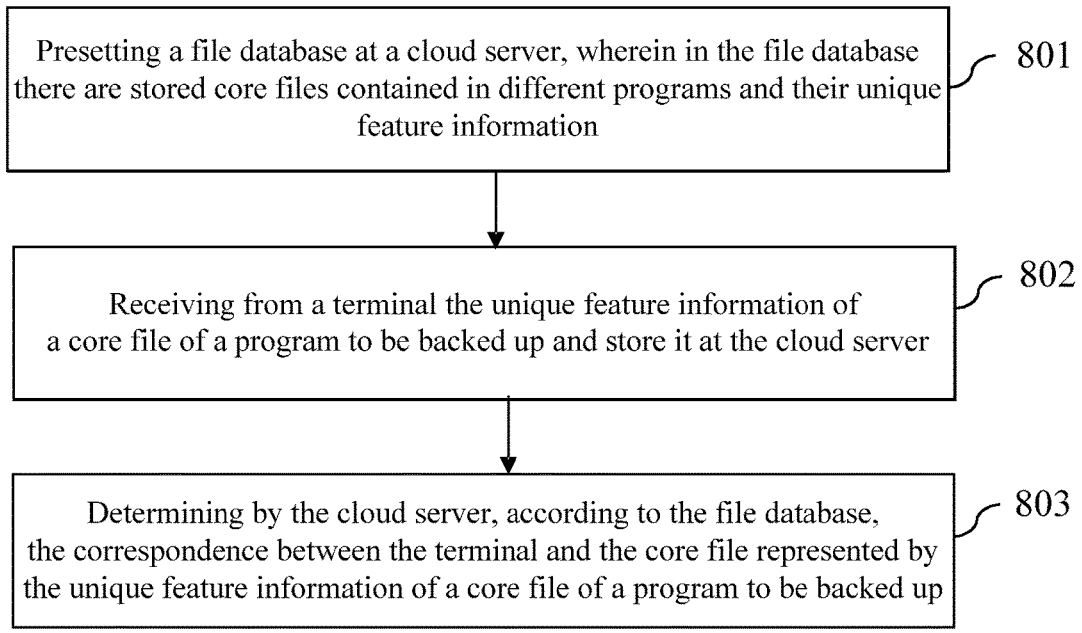
FIG. 8 shows schematically a flow chart of a terminal backup method according to an embodiment of the invention.

In a further aspect of the invention, there is further disclosed another terminal backup method. As shown in FIG. 8, FIG. 8 discloses a terminal backup method according to an embodiment of the invention comprising:

step 801: presetting a file database at a cloud server, wherein in the file database there are stored core files contained in different programs and their unique feature information;

step 802: receiving from a terminal the unique feature information of a core file of a program to be backed up and storing it at the cloud server;

step 803: determining by the cloud server, according to the file database, the correspondence between the terminal and the core file represented by the unique feature information of a core file of a program to be backed up.

The above different programs may refer to a program that may be installed at the terminal, such as an operating system, an application, etc.

For the unique feature information of a core file, it may be information that can be uniquely distinguished, such as the signature information of the file, or an MD5 value, etc.; and for the unique feature information of an application, it may be information that can be uniquely distinguished, such as the name and version number or ID number, etc. of the program.

In addition, if the cloud server cannot determine in the file database the core file corresponding to the unique feature information received from the terminal, the local core file of the terminal corresponding to the unique feature information is backed up and stored.

Optionally, the cloud server receives from the terminal a non-core file, a modified entry in a registry, a relative positional relationship between core files, and/or a positional relationship between a core file and a non-core file of a program to be backed up for backup and storage.

Optionally, in the file database there are further stored unique feature information of an application and its installation file.

For some software programs, the registry of the current operating system may be modified in the course of their installation, and therefore, at backup, the modified entry in the registry of the program to be backed up may be obtained by the terminal side, and sent to the cloud server for backup and storage, so as to restore the registry at recovery.

Figure 9:
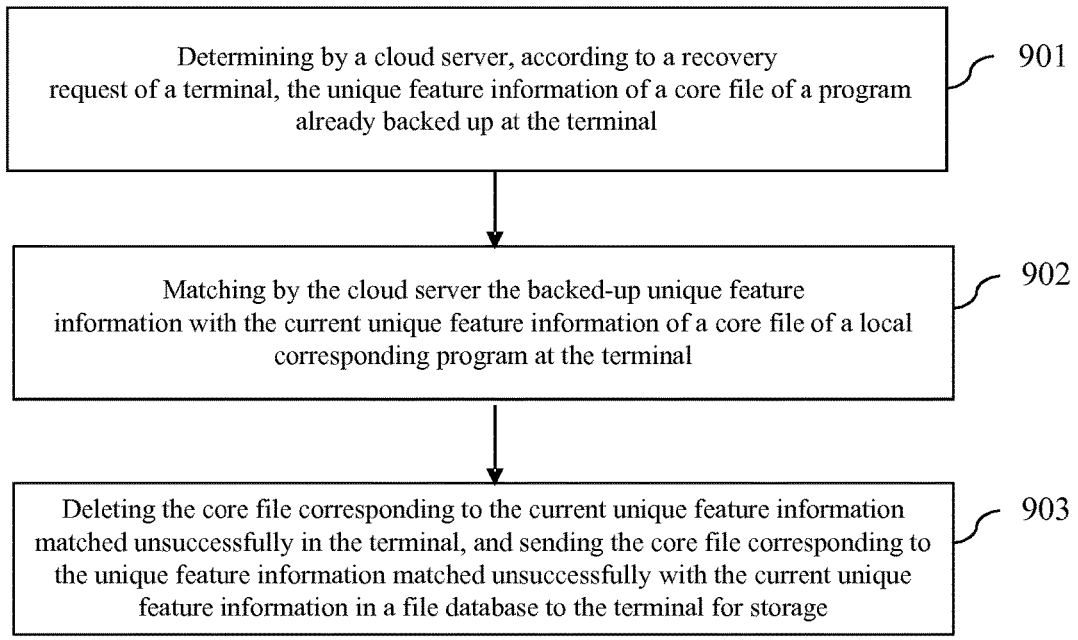
FIG. 9 shows schematically a flow chart of a terminal recovery method according to an embodiment of the invention.

In still another aspect of the invention, there is disclosed a terminal recovery method. As shown in FIG. 9, a terminal recovery method according to an embodiment of the invention comprises:

step 901: determining by a cloud server, according to a recovery request of a terminal, the backed-up unique feature information of a core file of a program in the terminal;

step 902: matching by the cloud server the backed-up unique feature information with the current unique feature information of a core file of a local corresponding program at the terminal;

step 903: deleting the core file corresponding to the current unique feature information matched unsuccessfully in the terminal, and sending the core file corresponding to the unique feature information matched unsuccessfully with the current unique feature information in a file database to the terminal for storage;

wherein the file database is preset at the cloud server and stores core files contained in different programs and their unique feature information.

Optionally, the cloud server sends a non-core file, and a modified entry in a registry of a backed-up program to the terminal for storage.

Optionally, the step of sending the core file corresponding to the unique feature information matched unsuccessfully with the current unique feature information in a file database to the terminal for storage further comprises: storing a core file according to the relative positional relationship between core files already recorded at the cloud server.

It will be apparent to those skilled in the art that the invention may further be implemented as an apparatus or a device program (e.g., a computer program and a computer program product) for carrying out a part or all of the method described herein. Such a program implementing the invention may be stored on a computer readable medium, or may be in the form of one or more signals. Such a signal may be obtained by downloading it from an Internet website, or provided on a carrier signal, or provided in any other form.

Figure 10:
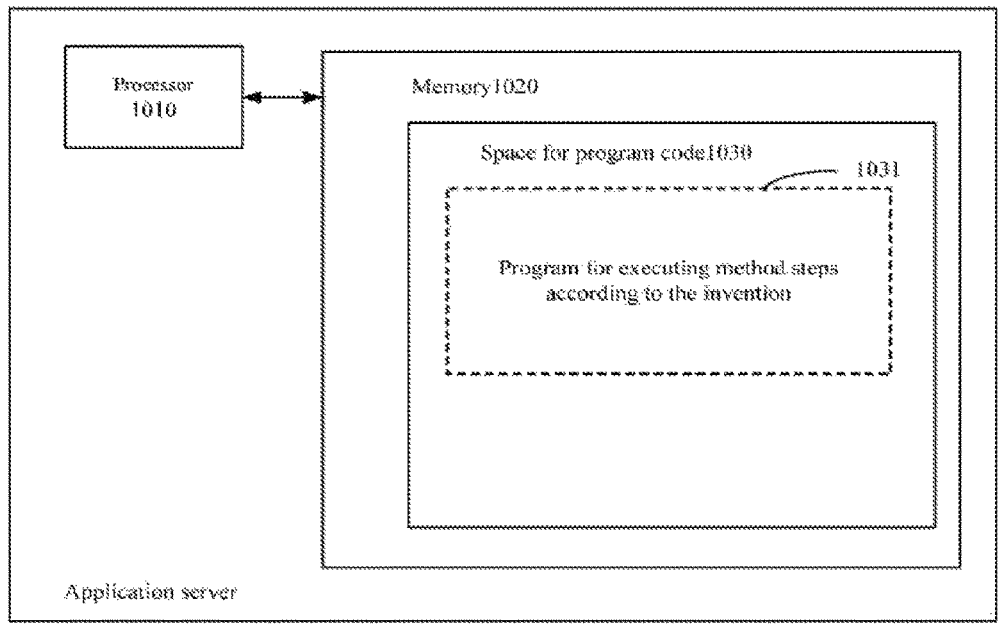
FIG. 10 shows schematically a block diagram of a server for executing a method according to the invention.
Figure 11:
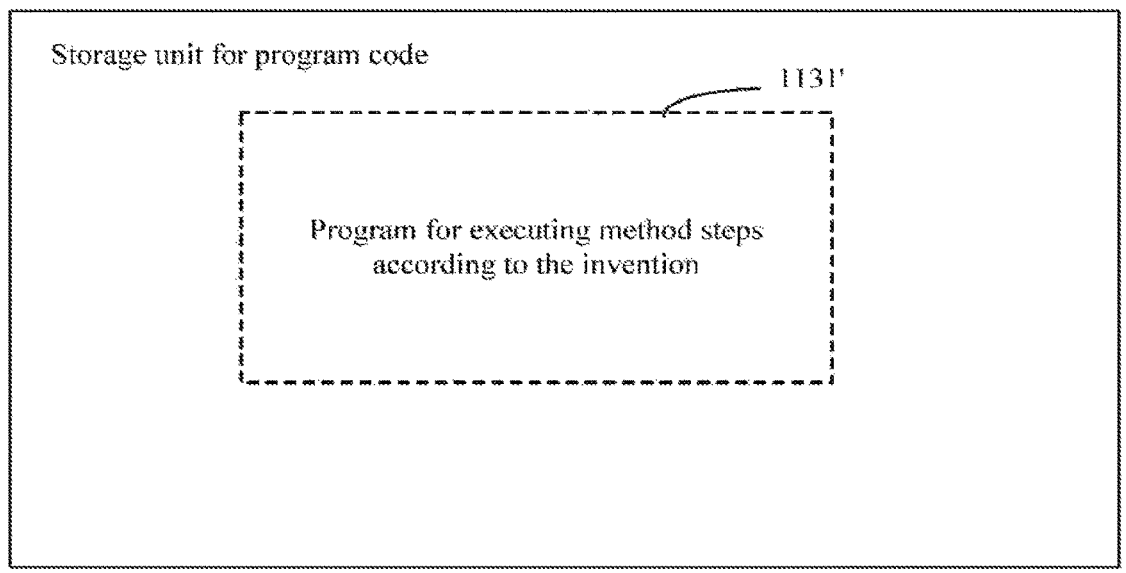
FIG. 11 shows schematically a storage unit for retaining or carrying a program code implementing a method according to the invention.

For example, FIG. 10 shows a server which may carry out a terminal backup and recovery method according to the invention, e.g., an application server. The server traditionally comprises a processor 1010 and a computer program product or a computer readable medium in the form of a memory 1020. The memory 1020 may be an electronic memory such as a flash memory, an EEPROM (electrically erasable programmable read-only memory), an EPROM, a hard disk or a ROM. The memory 1020 has a memory space 1030 for a program code 1031 for carrying out any method steps of any one of the methods as described above. For example, the memory space 1030 for a program code may comprise individual program codes 1031 for carrying out individual steps in the above methods, respectively. The program codes may be read out from or written to one or more computer program products. These computer program products comprise such a program code carrier as a hard disk, a compact disk (CD), a memory card or a floppy disk. Such a computer program product is generally a portable or stationary storage unit as described with reference to FIG. 11. The storage unit may have a memory segment, a memory space, etc. arranged similarly to the memory 1020 in the server of FIG. 10. The program code may for example be compressed in an appropriate form. In general, the storage unit comprises a computer readable code 1031', i.e., a code which may be read by e.g., a processor such as 1010, and when run by a server, the codes cause the server to carry out individual steps in the methods described above.

"An embodiment", "the embodiment" or "one or more embodiments" mentioned herein implies that a particular feature, structure or characteristic described in connection with an embodiment is included in at least one embodiment of the invention. In addition, it is to be noted that, examples of a phrase "in an embodiment" herein do not necessarily all refer to one and the same embodiment.

In the specification provided herein, a plenty of particular details are described. However, it can be appreciated that an embodiment of the invention may be practiced without these particular details. In some embodiments, well known methods, structures and technologies are not illustrated in detail so as not to obscure the understanding of the description.

It is to be noted that the above embodiments illustrate rather than limit the invention, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The invention may be implemented by means of a hardware comprising several distinct elements and by means of a suitably programmed computer. In a unit claim enumerating several devices, several of the devices may be embodied by one and the same hardware item. The usage of the words such as first, second, and third, etc. does not mean any ordering. Such words may be construed as naming.

Furthermore, it is also to be noted that the language used in the description is selected mainly for the purpose of readability and teaching, but not selected for explaining or defining the subject matter of the invention. Therefore, for those of ordinary skills in the art, many modifications and variations are apparent without departing the scope and spirit of the appended claims. For the scope of the invention, the disclosure of the invention is illustrative, but not limiting, and the scope of the invention is defined by the appended claims.

The invention claimed is:

1. A terminal backup method comprising:
   providing, by at least one processor, a user interface at a terminal, to provide, according to a preset display policy, different backup categories for a user to select for recovery, wherein the different backup categories comprise the terminal, an application, and/or user data related to the application, the different backup categories containing different backup objects; and
   backing up, by the at least one processor, according to a backup category selected by the user, at the terminal, a backup object contained in the backup category to a cloud server, when the backup category is the terminal, the method further comprising:
   obtaining, by the at least one processor, at the terminal, unique feature information of a core file of an operating system, and sending the unique feature information to the cloud server for backup and storage, wherein the unique feature information of the core file comprises signature information of the core file or an MD5 value of the core file;
   when recovering the core file of the operating system of the terminal, matching, by the at least one processor, the unique feature information of the core file of the operating system of the terminal already backed up at the cloud server with current unique feature information of the core file of the operating system at the terminal;
   deleting, by the at least one processor, the core file corresponding to the current unique feature information matched unsuccessfully at the terminal, and receiving the core file corresponding to the unique feature information matched unsuccessfully from the cloud server for storage, wherein a file database is preset at the cloud server, and the file database stores core files of different operating systems and unique feature information of the core files,
   the backup object contained in the backup category of the terminal comprises an installed application and the core file of an operating system, and a file corresponding to the backup object contained in the backup category comprises unique feature information of the installed application and the core file of the operating system,
   the backup object contained in the backup category of the application comprises the application already installed in the terminal, and the file corresponding to the backup object contained in the backup category comprises the unique feature information of the installed application,
   the backup object contained in the backup category of the user data related with the application comprises a user data file of the application, and the file corresponding to the backup object contained in the backup category comprises the user data file of the application; and
   determining, according to the backup category selected by the user, a file corresponding to the backup object contained in the backup category at the cloud server, and utilizing the file to perform a corresponding recovery at the terminal.

2. The terminal backup method as claimed in claim 1, when the backup category is the terminal, the method further comprising:
   obtaining, at the terminal, the unique feature information of the installed application and the core file of the operating system, and sending to the cloud server for backup and storage; and
   if the core file of the operating system corresponding to the unique feature information sent by the terminal cannot be determined in the file database, sending by the terminal a local core file corresponding to the unique feature information to the cloud server for backup and storage.

3. The terminal backup method as claimed in claim 1, wherein when the backup category is the application, the method further comprising: obtaining at the terminal the unique feature information of the installed application and sending to the cloud server for backup and storage;
   wherein the file database is preset at the cloud server, and the file database stores unique feature information and installation files of different applications.

4. The terminal backup method as claimed in claim 1, wherein when the backup category is the user data related with the application, obtaining at the terminal the user data of the application selected by the user, and sending the user data of the application to the cloud server for backup and storage.

5. The terminal backup method as claimed in claim 1, wherein when the backup category is the terminal, the method further comprising:
   matching the unique feature information of the core file of the operating system of the terminal already backed up at the cloud server with current unique feature information of the core file of the operating system at the terminal;
   deleting the core file corresponding to the current unique feature information matched unsuccessfully at the terminal, and receiving the core file corresponding to the unique feature information matched unsuccessfully from the cloud server for storage; and
   performing, according to the backed up unique feature information of the application already installed at the terminal, an installation at the terminal using the installation file of a corresponding application pre-stored in the file database in the cloud server,
   wherein the file database stores the core files of different operating systems and the unique feature information of the core files, and unique feature information and installation files of different applications.

6. The terminal backup method as claimed in claim 1, wherein when the backup category is the application, the method further comprising:
   performing, according to the unique feature information of the application already installed at the terminal, an installation at the terminal using the installation file of a corresponding application pre-stored in the file database in the cloud server,
   wherein the file database stores the unique feature information and installation files of different applications.

7. The terminal backup method as claimed in claim 1, wherein when the backup category is the user data related with the application, the method further comprises:

receiving the user data related with the application from the cloud server for storage.

8. A terminal backup method comprising:

presetting, by at least one processor, a file database at a cloud server, wherein the file database stores core files of different operating systems and unique feature information of the core files;

receiving, by the at least one processor, from a terminal, unique feature information of a core file of an operating system to be backed up and storing the unique feature information of the core file of the operating system at the cloud server, wherein the unique feature information of the core file comprises signature information of the core file or an MD5 value of the core file;

determining, by the at least one processor, by the cloud server, according to the file database, correspondence between the terminal and the core file represented by the unique feature information of the core file of the operating system to be backed up;

when recovering the core file of the operating system of the terminal, matching by the at least one processor, the unique feature information of the core file of the operating system of the terminal already backed up at the cloud server with current unique feature information of the core file of the operating system at the terminal; and deleting, by the at least one processor, the core file corresponding to the current unique feature information matched unsuccessfully at the terminal, and receiving the core file corresponding to the unique feature information matched unsuccessfully from the cloud server for storage, wherein the cloud server receives from the terminal a non-core file, a modified entry in a registry, a relative positional relationship between core files, and/or a positional relationship between the core file and the non-core file of the operating system to be backed up for backup and storage.

9. The terminal backup method as claimed in claim 8, further comprising if the cloud server cannot determine in the file database the core file corresponding to the unique feature information received from the terminal, backing up and storing a local core file of the terminal corresponding to the unique feature information.

10. The terminal backup method as claimed in claim 9, wherein the file database further stores unique feature information of the operating system and an installation file.

11. The terminal backup method as claimed in claim 8, further comprising:

determining by the cloud server, according to a recovery request of the terminal, the backed-up unique feature information of the core file of the operating system in the terminal;

matching by the cloud server, the backed-up unique feature information with current unique feature information of the core file of the operating system in the terminal; and deleting the core file corresponding to the current unique feature information matched unsuccessfully in the terminal, and sending the core file corresponding to the unique feature information matched unsuccessfully with the current unique feature information in the file database to the terminal for storage.

12. The terminal backup method as claimed in claim 11, wherein the cloud server sends the non-core file, and the modified entry in the registry to the terminal for storage.

13. The terminal backup method as claimed in claim 11, wherein the sending the core file corresponding to the unique feature information matched unsuccessfully with the current unique feature information in the file database to the terminal for storage further comprises: storing the core file according to the relative positional relationship between core files already recorded at the cloud server.

14. A non-transitory computer readable storage medium having instructions stored thereon that, when executed by at least one server cause the at least one server to perform operations, the operations comprising:

presetting a file database using a cloud server, wherein the file database stores core files of different operating systems and unique feature information of the core files;

receiving from a terminal, unique feature information of a core file of an operating system to be backed up and storing the unique feature information of the core file of the operating system at the cloud server, wherein the unique feature information of the core file comprises signature information of the core file or an MD5 value of the core file;

determining by the cloud server, according to the file database, correspondence between the terminal and the core file represented by the unique feature information of the core file of the operating system to be backed up;

when recovering the core file of the operating system of the terminal, matching the unique feature information of the core file of the operating system of the terminal already backed up at the cloud server with current unique feature information of the core file of the operating system at the terminal; and deleting the core file corresponding to the current unique feature information matched unsuccessfully at the terminal, and receiving the core file corresponding to the unique feature information matched unsuccessfully from the cloud server for storage, wherein the cloud server receives from the terminal a non-core file, a modified entry in a registry, a relative positional relationship between core files, and/or a positional relationship between the core file and the non-core file of the operating system to be backed up for backup and storage.

\* \* \* \* \*